(12) United States Patent
Sunabashiri

(10) Patent No.: US 7,481,454 B2
(45) Date of Patent: Jan. 27, 2009

(54) AIRBAG APPARATUS

(75) Inventor: Yukisada Sunabashiri, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 414 days.

(21) Appl. No.: 10/566,658

(22) PCT Filed: Jun. 27, 2005

(86) PCT No.: PCT/GB2005/002507

§ 371 (c)(1),
(2), (4) Date: Feb. 1, 2006

(87) PCT Pub. No.: WO2006/000800

PCT Pub. Date: Jan. 5, 2006

(65) Prior Publication Data

US 2006/0186652 A1    Aug. 24, 2006

(30) Foreign Application Priority Data

Jun. 29, 2004    (JP) .............................. 2004-190953

(51) Int. Cl.
*B06R 21/16*    (2006.01)
(52) U.S. Cl. .................................... 280/740; 280/730.2
(58) Field of Classification Search .............. 280/730.2, 280/740, 742
See application file for complete search history.

(56) References Cited

U.S. PATENT DOCUMENTS

| | | | | |
|---|---|---|---|---|
| 6,755,436 | B2 * | 6/2004 | Hess et al. | 280/730.2 |
| 6,962,364 | B2 * | 11/2005 | Ju et al. | 280/730.2 |
| 2002/0036395 | A1 | 3/2002 | Bakhsh et al. | |
| 2003/0132620 | A1 | 7/2003 | Kawasaki et al. | |
| 2004/0080145 | A1 | 4/2004 | Takahashi | |

FOREIGN PATENT DOCUMENTS

WO    WO-03/002488 A    1/2003

* cited by examiner

*Primary Examiner*—Faye M. Fleming
(74) *Attorney, Agent, or Firm*—Global IP Counselors, LLP

(57) ABSTRACT

An air bag apparatus is installed along the front-to-rear axis of the interior-facing side roof rail of a vehicle. The air bag has an air bag body, an inflator and a fluid body supply device. The air bag body has a plurality of inflatable chambers with at least one specific chamber and at least one general chamber. When in the deployed state, the specific chamber is positioned adjacent a structural pillar member of a vehicle side portion of the vehicle body. When in the deployed state the general chamber is located adjacent the vehicle side portion. In use, the inflator supplies a high-pressure fluid to the air bag body thereby inflating each of the chambers and the fluid supply delay device selectively delays the high-pressure fluid to the specific chamber relative to the general chamber.

17 Claims, 6 Drawing Sheets

US 7,481,454 B2

AIRBAG APPARATUS

CROSS-REFERENCE TO RELATED APPLICATIONS

This nonprovisional application claims priority under 35 U.S.C. §119(a) to Japanese Patent Application No. 2004-190953, filed in Japan on Jun. 29, 2004, the entire contents of which are hereby incorporated by reference.

BACKGROUND OF THE INVENTION

1. Field of the Invention

The present invention generally relates to a safety apparatus for motor vehicles. In particular, the invention relates to a curtain air bag apparatus. During an emergency, such apparatus is constructed so that an air bag body is adapted to be inflated and deployed in a curtain shape that extends from a roof side-rail downwardly, thereby converting the interior side portion of a vehicle compartment.

2. Background Information

Air bag apparatus provided along a front-to-rear axis in the side portion of a vehicle compartment roof side-rail is typically known as a curtain airbag. In an emergency situation, such as a side collision or a rollover of the car, an air bag body is inflated and deployed in a curtain shape in the downward direction to protect a passenger located in a front and/or rear seats. In a crash situation, this deployment prevents direct contact of the passenger with the interior side-wall of the vehicle compartment, thus absorbing collision energy.

When not deployed, the air bag body is typically received in a folded state between the interior facing side of the vehicle roof side-rail and the interior roof trim. The interior roof trim serves to cover the air bag body, which is conveniently folded in a bellows shape. During an emergency, such as a vehicle side impact, a high-pressure gas is released into the air bag body from an inflator. This causes the air bag body to be deployed in a curtain shape along the interior side-wall of the vehicle compartment.

Curtain air bag constructions typically consist of a plurality of inflation chambers (bladders) arranged along the front-to-the rear axis of the vehicle body. The chambers are also usually linked to each other. These chambers are inflated individually by a high-pressure gas, thereby expanding to define the fully deployed air bag body, for example see Japanese Patent Application, Publication No. 2002-302006.

In conventional motor vehicles, however, the interior sidewall of the vehicle compartment where the air bag body is deployed is constructed mainly of side window glass, i.e., the front and rear side windows. A front pillar, a center pillar, and a rear pillar are also positioned respectively in the front part, the intermediate part, and the rear part of the side window glass. As will be appreciated, these structural pillars are necessary to define and strengthen the side-wall of the vehicle compartment as well as to support the roof. Typically, these structural pillars extend inwardly into the interior of the vehicle compartment so that the exterior of the vehicle appears to have a substantially planar surface. Hence, the interior surface of the side-walls of the vehicle compartment are typically non-planar and are somewhat contoured, with recesses formed where the side window glass is located between the structural pillars.

Known curtain air bags are designed to cover the entire side portion of the vehicle, from the front passenger side of the side window glass as far as the rear pillar. Such deployment is necessary to protect passengers in both the front and rear seats, particularly in the event of a side impact or rollover. The plurality of inflation chambers in the body of the air bag are, thus, disposed along the length of vehicle interior compartment including across the structural center and rear pillars. Therefore, when the specific chambers are inflated those located over the center and rear pillars will extend into the interior space of the vehicle compartment by the same amount as the pillars extend into the vehicle interior. This results in an uneven deployment configuration in which those inflation chambers located over the pillars deploy further into the vehicle interior compared to those inflation chambers positioned adjacent to the side window glass. Accordingly, when each chamber of the air bag body is fully inflated, the inflation force of the chambers overlaying the structural pillars causes those located adjacent to the side windows to be pulled further into the interior of the vehicle away from the side window glass.

The above description of traditional curtain air bag deployment can cause problems particularly when the passenger is moved in an outward direction (relative to the vehicle) as a consequence of a side collision or a rollover. Collision forces will move the passenger towards the side window glass, where the inflation chambers are spaced away from the side window glass and, thereby, the air bag will engage the passenger in the middle of air bag deployment. Hence, the air bag body fails to occupy the space between the passenger and the side window glass as intended and the protective effect of the curtain air bag is severely diminished.

SUMMARY OF THE INVENTION

Accordingly, it is an object of the present invention to provide an air bag apparatus so constructed that the general inflation chambers positioned adjacent to a side-wall or side window of a vehicle compartment are inflated prior to specific inflation chambers positioned adjacent to a pillar or other structural member, thereby preventing the inflation and positioning of the general chambers from being affected by the inflation of the specific chambers.

According to a first aspect of the present invention, there is provided an air bag apparatus for a vehicle, comprising: an air bag body including a first chamber and a second chamber each arranged along a roof side rail in a front to rear direction of a vehicle, the first chamber being situated adjacent to a pillar member in the vehicle, and a fluid supply delay device attached to the airbag body for delaying supply of a high-pressure fluid to the first chamber as compared to that of the high-pressure fluid supplied to the second chamber so that the second chamber is fully inflated before the first chamber is fully inflated.

In a preferred embodiment, the invention provides an air bag apparatus adapted so as to be suitably located along the front-to-rear axis of the interior facing side roof rail of a vehicle body, the air bag comprising an air bag body, an inflator means, the inflator means being in fluid communication with the air bag body, and a fluid supply delay means;

the air bag body comprising a plurality of inflatable chambers, wherein each of the inflatable chambers comprises a fluid inlet port, the plurality of inflatable chambers comprising at least one specific chamber and at least one general chamber, wherein when in the deployed state the at least one specific chamber is positioned adjacent to a pillar member of a vehicle side portion of the vehicle body and wherein when in the deployed state the at least one general chamber is located adjacent to a side-wall of the vehicle side portion, wherein, in use, the inflator means supplies a high-pressure fluid to the air bag body thereby inflating each of the plurality of chambers and wherein the fluid supply delay means selectively delays the supply of the high-pressure fluid to the at least one specific chamber relative to the at least one general chamber.

According to the apparatus of the present invention, since supply of the high-pressure fluid to the specific chambers positioned adjacent to the pillar member is delayed as compared to the general chambers other than the specific chambers, the general chambers can be inflated prior to the specific chambers. Therefore, when the general chambers are inflated, the inflation of each of the general chambers is less affected by the specific chambers deploying adjacent to the pillar member extending inside the vehicle compartment. Thus, the invention provides the desired deployment behaviour of the general chambers, namely deploying the general chambers along the side-wall of the vehicle compartment efficiently and effectively.

Accordingly the general chambers deploy and enter into a clearance between the passenger and the side-wall of the vehicle compartment, thereby improving significantly the protection offered to the passenger's head during a side impact or rollover. Note that the specific chambers are also inflated, even if inflation is fractionally delayed relative to the general chambers. Consequently, the specific chambers also ensure protection for the passenger from the pillar member.

A second aspect of the present invention provides an air bag apparatus adapted so as to be suitably located along the front-to-rear axis of an interior roof side rail on a vehicle body, the air bag comprising an air bag body, an inflator means, the inflator means being in fluid communication with the air bag body, and a fluid supply delay means located between the inflator means and the air bag body; the air bag body comprising a plurality of inflatable chambers defined along the front-to-rear axis of the vehicle body, wherein each of the inflatable chambers comprises a fluid inlet port, the plurality of inflatable chambers comprising at least one specific chamber and at least one general chamber, wherein when in the deployed state the at least one specific chamber is positioned adjacent to a pillar member of a vehicle side portion of the vehicle body and wherein when in the deployed state the at least one general chamber is located adjacent to a side-wall of the vehicle side portion, the air bag body being stowed in an upward direction when in an undeployed state, wherein on deployment the inflator means supplies a high-pressure fluid to the air bag body thereby inflating each of the plurality of chambers in the downward direction along the side portion of the vehicle body, and wherein the fluid supply delay means selectively delays the supply of the high-pressure fluid to the at least one specific chamber relative to the at least one general chamber.

In one embodiment, the air bag body is made from a fabric material, such as canvas. In one embodiment, the high-pressure fluid is a gas.

A further aspect of the invention provides for motor vehicles comprising the air bag apparatus of the invention. Typically, such motor vehicles will include, but are not limited to: cars, vans, mini-buses, SUVs, MPVs or any other motor vehicle that is designed to carry passengers and for which installation of air bag safety apparatus is considered as appropriate.

The various aspects or embodiments of the invention may be employed alone or in combination.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
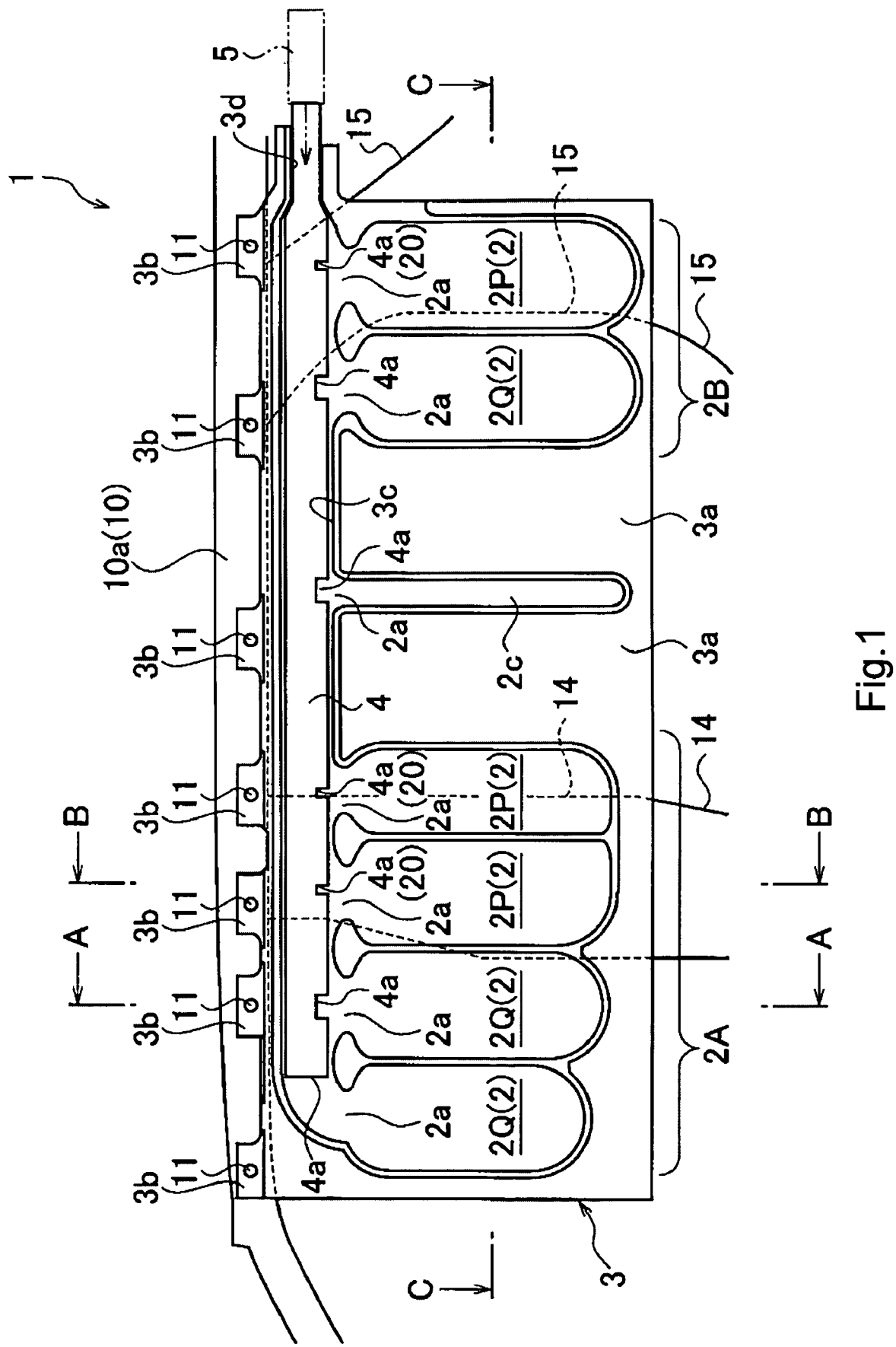
FIG. 1 shows a cross-sectional side view showing a deployed state of an air bag apparatus according to a first embodiment of the present invention.

In more detail, an air bag apparatus 1 in the first preferred embodiment, as shown in FIG. 1, is provided when an air bag body 3 having a plurality of inflatable chambers 2 defined in a front-to-rear direction along the axis of a vehicle body. Each chamber is suitably arranged in a front-to-rear direction along a roof side rail 10. The air bag body 3 is formed substantially in a rectangular 5 shape and made of two suitable flexible materials lacking elasticity—for example, formed from gluing together canvas or another appropriate fabric—where a plurality of chambers 2 are formed between these two flexible materials. Appropriate fabrics can include woven or nonwoven materials.

The plurality of the chambers 2 are arranged to be divided into a front side chamber group 2A for front seat passengers and a rear seat chamber group 2B for rear seat passengers. Optionally, an intermediate chamber 2C can be provided between the front seat chamber group 2A and the rear seat chamber group 2B to strengthen a separation portion 3a between both the chamber groups 2A, 2B.

Figure 2:
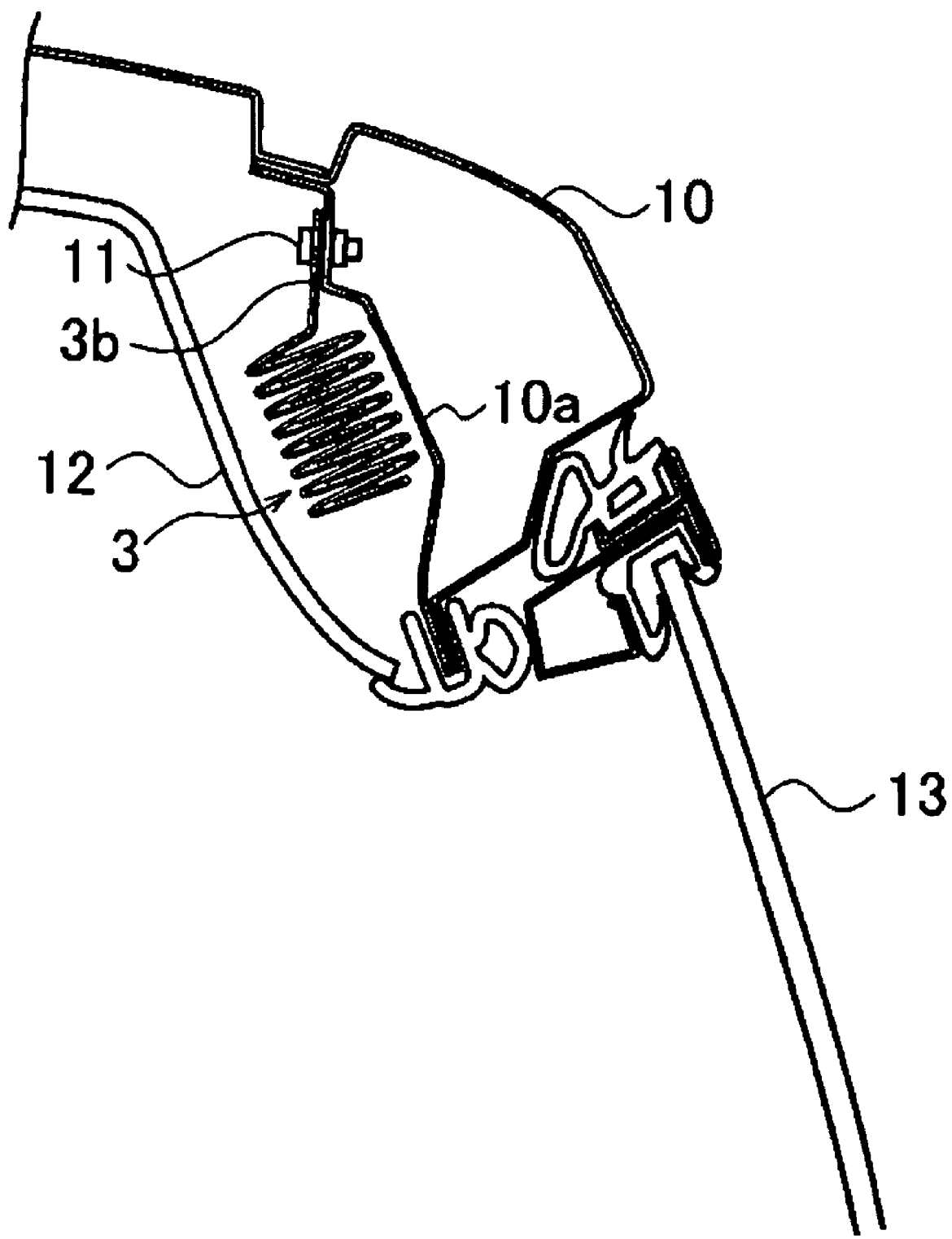
FIG. 2 shows a cross-sectional view taken along line A-A in FIG. 1, showing a receiving state of the air bag apparatus in the first embodiment of the present invention.
Figure 3:
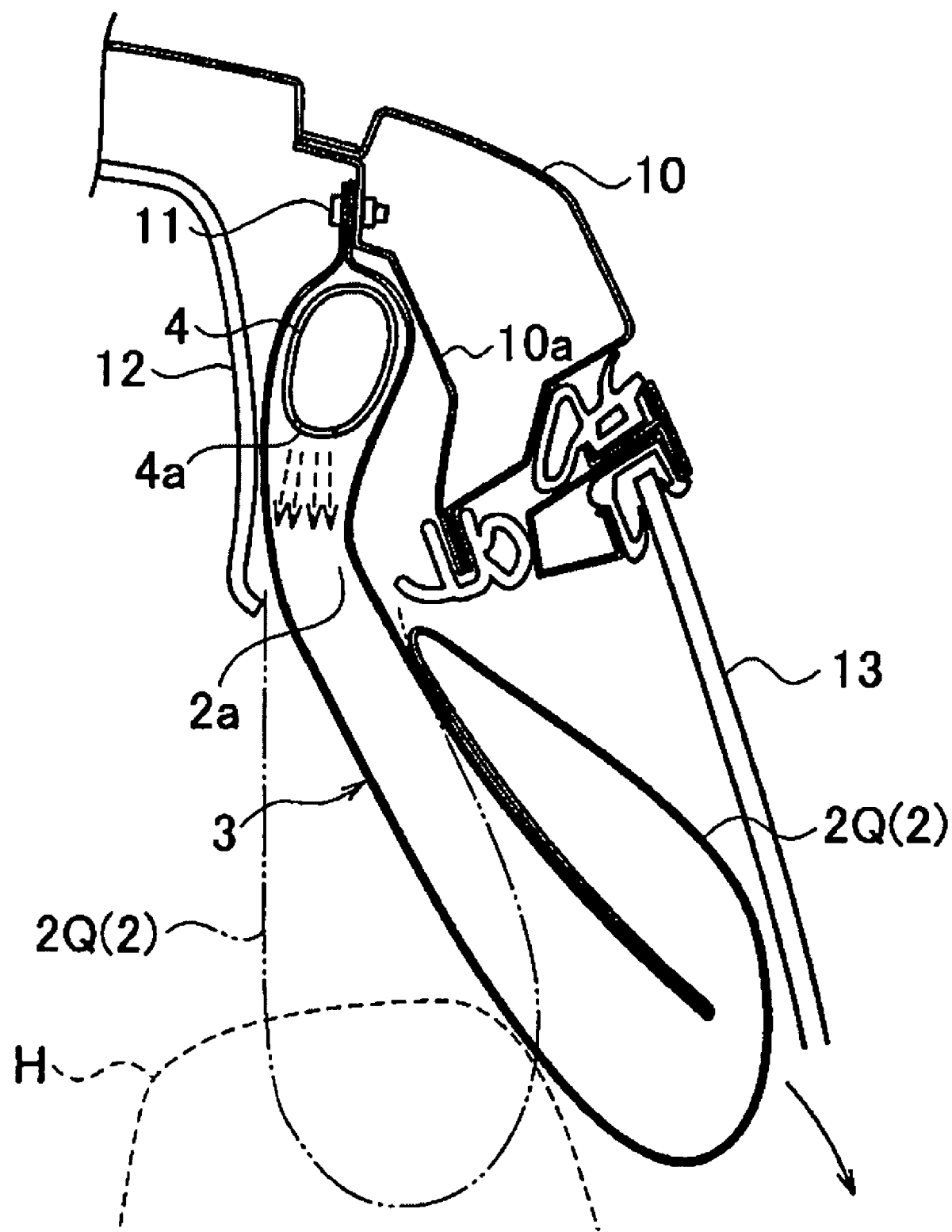
FIG. 3 shows a cross-sectional view taken along line A-A in FIG. 1 showing a state during the deployment of the air bag body in the first embodiment of the present invention.
Figure 4:
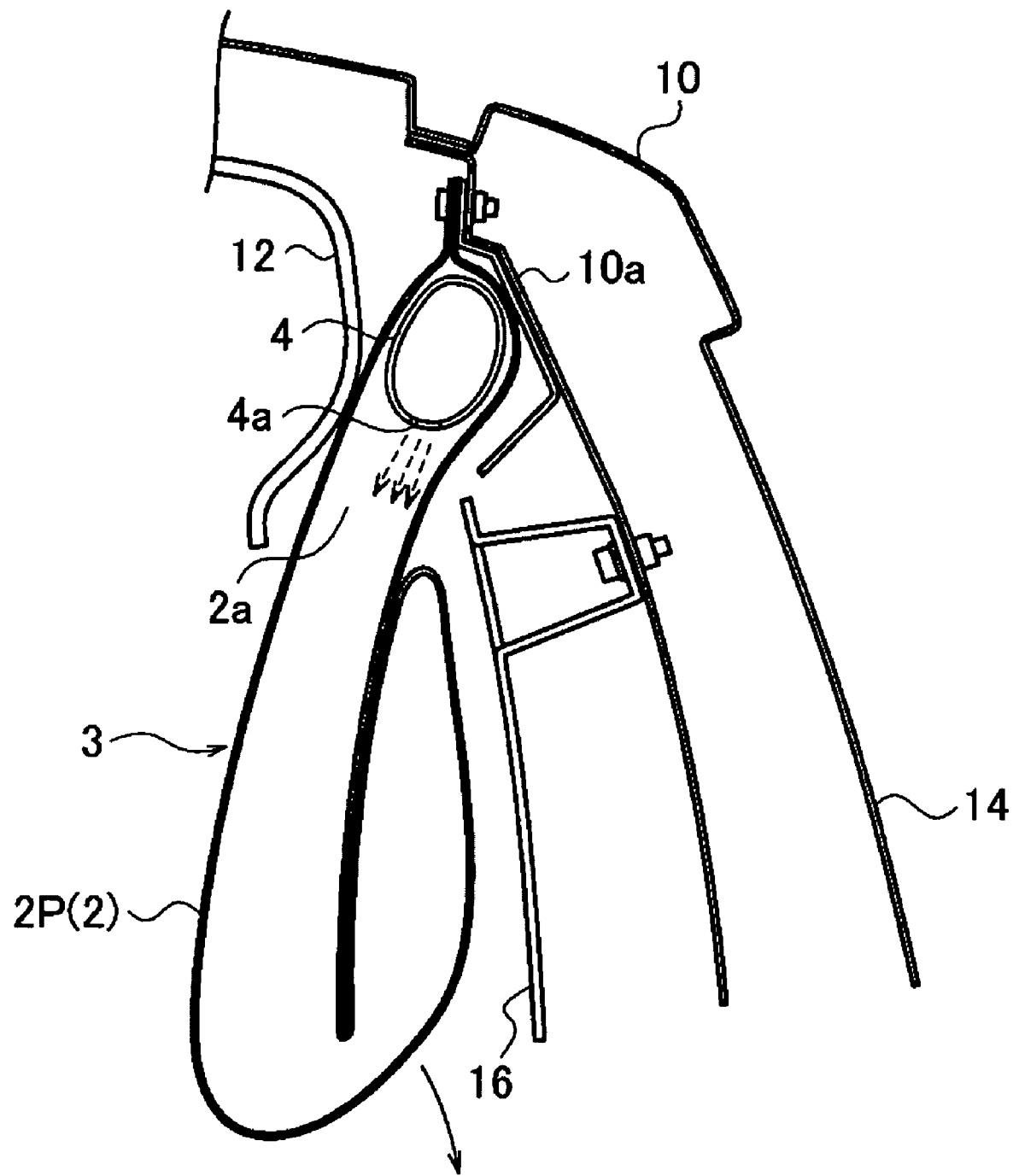
FIG. 4 shows a cross-sectional view taken along line B-B in FIG. 1, showing a state during the deployment of the air bag body in the first embodiment of the present invention.

The air bag body 3, as shown in FIGS. 2 to 4, is suitably adapted to be mounted along the front-to-rear axis of the vehicle body on an inner rail 10a on the interior roof side rail 10, having a closed cross section structure. An engagement between the air bag body 3 and the inner rail 10a can suitably be achieved via a plurality of mounting pieces 3b projected in a top edge of the air bag body 3 by, for example, a nut and bolt arrangement 11. However, the skilled person will appreciate that suitable alternative means for mounting can be used.

An elongate passage 3c communicates with a fluid inlet port 2a formed in a top portion of each inflation chamber 2. The elongate passage 3c is formed along the top edge of the air bag body 3, and a flexible duct 4 is inserted into the elongate passage 3c from a port 3d positioned in the rear side of the vehicle. The port 3d is in fluid communication with an inflator 5, which is typically located in the rear end of the vehicle.

A fluid outlet port 4a communicates with the fluid inlet port 2a of each chamber 2. The fluid outlet port is formed in the duct 4 such that during air bag deployment the inflator 5 operates to inject high-pressure fluid (typically a gas) into the duct 4, thus supplying the high-pressure fluid to each chamber via the fluid inlet port 2a via the fluid outlet port 4a.

When in a stowed configuration, as shown in FIG. 2, the undeployed air bag body 3 is received between the interior-facing inner rail 10a of the roof side rail 10 and a roof trim member 12 that covers the inside of the vehicle compartment.

The air bag body 3 can be suitably folded in the upward direction. Inflation of the air bag body 3 by the high-pressure fluid supplied from the inflator 5, see FIGS. 4, 5, causes the roof trim 12 to be displaced away from the inner rail 10a due to the inflation pressure. Thus, the air bag body 3 deploys in a curtain shape downwardly along the side window glass 13 (refer also to FIG. 1). However, in regard to each inflation chamber 2, as shown in FIG. 1, the center pillar 14 is positioned partially facing the front seat chamber group 2A, and a rear pillar 15 is positioned partially facing the rear seat chamber group 2B. These specific chambers 2P positioned facing the pillars 14, 15 are deployed along an inner side face of the pillars 14, 15. In this case, since the pillars 14, 15 extend more into the inside of the vehicle compartment than the side window glass 13, the specific chambers 2P are positioned inside the vehicle compartment by the extending amount of each of the pillars 14, 15 more than the general chambers 2Q deploying along the side window glass 13.

Note that a trim 16, as shown in FIG. 4, is attached at an inside of the vehicle compartment to each of the pillars 14, 15, thus further defining the pillars 14, 15 as including the trim 16. Accordingly the trim 16 defines the inner side of the pillars 14, 15 that faces the interior of the vehicle compartment. In accordance with the present invention, the specific chambers 2P, to be described later in detail, are adapted to deploy along the trim 16.

In the first embodiment of the present invention the air bag 1 is provided with a fluid supply delay device 20 so constructed that supply of the high-pressure fluid to the specific chambers 2P positioned facing the front and rear pillars 14, 15 among the chambers 2 is delayed as compared to the general chambers 2Q. The fluid supply delay device 20 in the first embodiment, as shown in FIG. 1, consists of an outlet port throttling structure. Accordingly, each of the fluid outlet ports 4a is positioned corresponding to the mouth or opening 2a of each of the specific chambers 2P and general chambers 2Q. However, the diameter of the port 4a for each of the specific chambers 2P is smaller than that of the diameter of the port 4a for each of the general chambers 2Q. Typically, the fluid outlet port 4a of the intermediate chamber 2c is formed to be substantially equal in size to that of each of the general chambers 2Q.

According to the air bag apparatus 1 for the vehicle in the first embodiment as described above, in a situation where an emergency state such as a side collision or a rollover of a vehicle occurs, the high-pressure fluid generated by operation of the inflator 5 is supplied to the duct 4, and flows via the fluid inlet port 2a from the fluid outlet port 4a of the duct 4 into each chamber 2. Then, the air bag body 3, which is received inside the roof trim 12, deploys in the downward direction by inflation of each chamber 2. However, since the air bag apparatus 1 for the vehicle in the first embodiment is provided with the fluid supply delay device 20 the fluid flow amount to the general chambers 2Q is greater than that to the specific chambers 2P. Accordingly the inflation of the general chambers 2Q (the intermediate chamber 2c included, the same hereinafter) is made prior to that of the specific chambers 2P. As a result, when the general chambers 2Q are inflated, influence of the specific chambers 2P deploying along the pillars 14, 15 on the inflation of the general chambers 2Q is significantly reduced. As a result, the general chambers 2Q, as shown in a solid line in FIG. 5, demonstrate the intended deployment behaviour, namely they can be deployed along the side window glass 13 efficiently.

Figure 5:
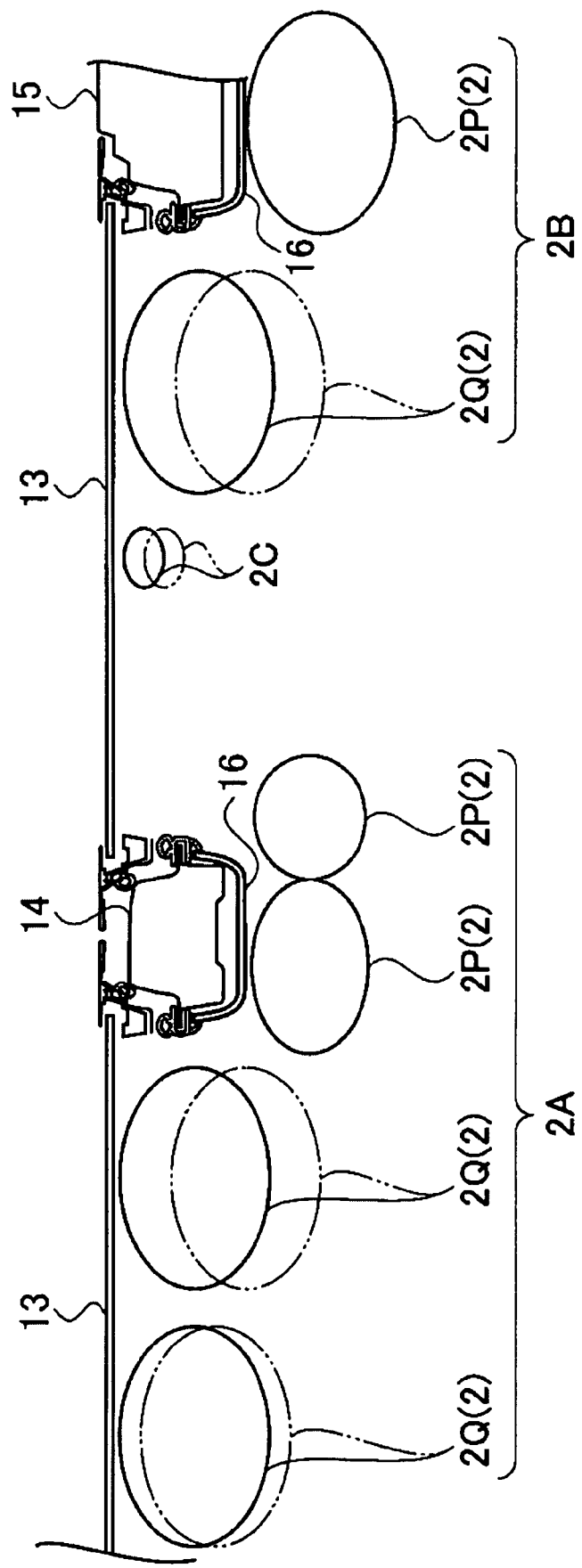
FIG. 5 shows a cross-sectional view taken along line C-C in FIG. 1.

Note that a two-dotted line in each of FIG. 5 and FIG. 3 shows the deployed state of the conventional prior art air bag body where the general chambers 2Q are spaced from the side window glass 13, due to influence of the specific chambers 2P.

According to the first embodiment, the general chambers 2Q, as shown in FIG. 3, deploy and enter into a clearance between a passenger head H and the side window glass 13, thereby improving the protective effect on the passenger H.

Of course, the specific chambers 2P, as shown in FIG. 4, are inflated even if inflated in a delay (by milliseconds or at most seconds) as compared to the general chambers 2Q, the specific chambers 2P are deployed along the center pillar 14 and the rear pillar 15. This ensures a protection effect on the passenger H with regard to the pillars 14, 15.

Figure 6:
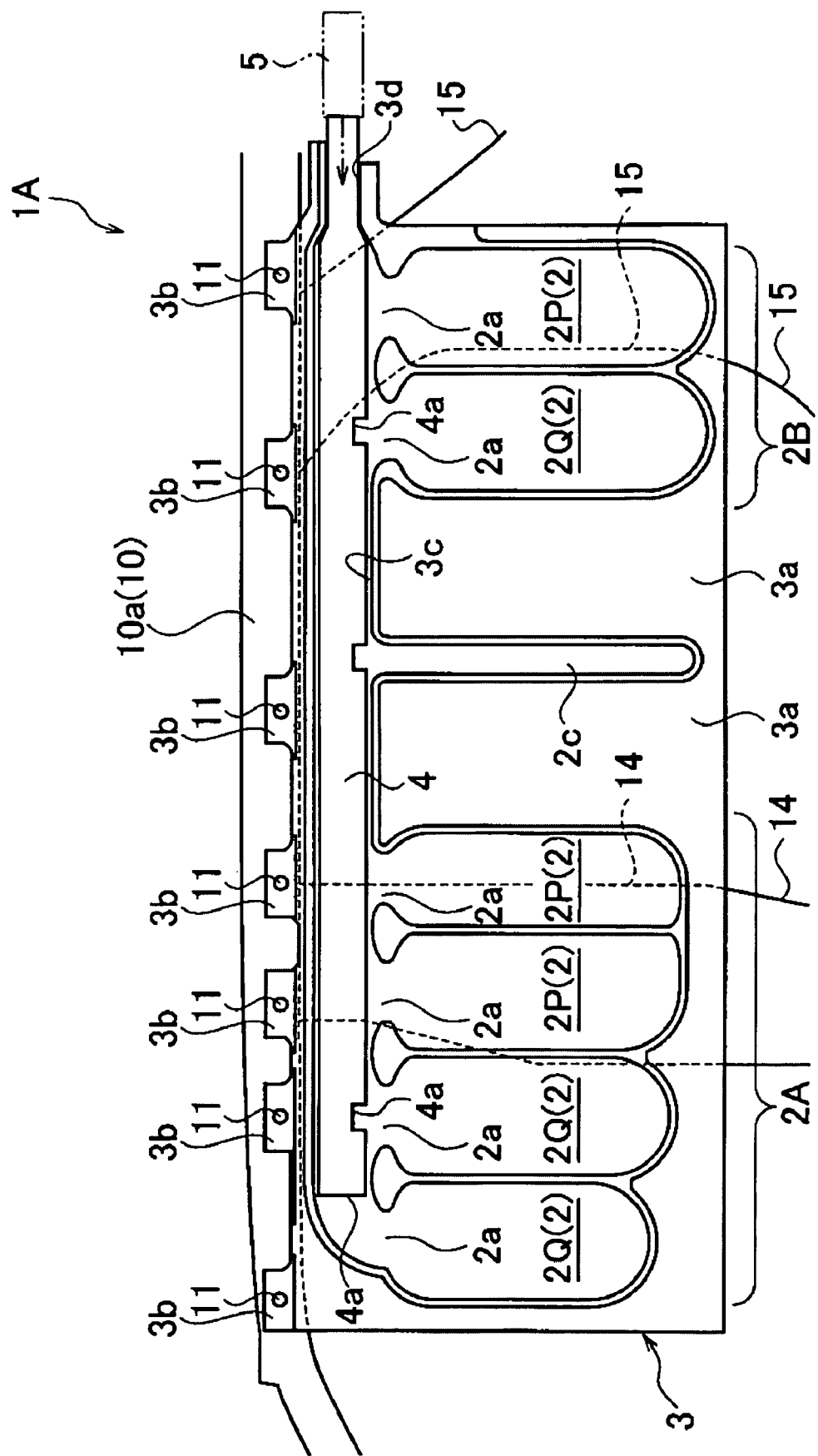
FIG. 6 shows a cross-sectional side view depicting the deployed state of an air bag body in a second embodiment of the present invention.

FIG. 6 shows a second embodiment of the present invention, and omits explanations identical to those of the first embodiment by referring to identical numerals as components corresponding to components in the first embodiment. FIG. 6 is a cross-sectional view showing a deployed state of the air bag body.

An air bag apparatus 1A for a vehicle in the second embodiment is essentially similar to the air bag apparatus 1 for the vehicle in the first embodiment. As shown in FIG. 6, the flexible duct 4 to which the high-pressure fluid of the inflator 5 is supplied is inserted into the elongate passage 3c formed on the top edge of the air bag body 3, and the high-pressure fluid is supplied via the fluid inlet ports 2a from the fluid outlet ports 4a formed in the duct 4 to the chambers 2.

The specific chambers 2P of the front seat chamber group 2A are positioned facing the center pillar 14, the specific chambers 2P of the rear seat chamber group 2B are positioned facing the rear pillar 15, and the other general chambers 2Q are positioned facing the side window glass 13. In the second preferred embodiment, the fluid supply delay device 20 is formed of an outlet closing structure in which those fluid outlet ports 4a positioned corresponding to the openings 2a of the specific chambers 2P of the duct 4 are closed off. Therefore, in the second embodiment, only the fluid outlet ports 4a corresponding to the general chambers 2Q and the fluid outlet port 4a corresponding to the intermediate chamber 2C are provided.

Hence, according to the air bag apparatus 1A for the vehicle as defined in the second preferred embodiment, during deployment the high-pressure fluid is supplied from the inflator 5 to each chamber 2 via the duct 4. The high-pressure fluid is discharged from the fluid outlet ports 4a positioned corresponding to the general chambers 2Q and the intermediate chamber 2C. Accordingly, the inflation of the general chambers 2Q (the intermediate chamber 2c included) can be performed prior to that of the specific chambers 2P in the same way as the first preferred embodiment. Consequently, the general chambers 2Q can be deployed along the side window glass 13 efficiently without influence from the specific chambers 2P. On the other hand, since the fluid inlet ports 2a of the specific chambers 2P are in communication with the fluid outlet ports 4a via a clearance between the elongate passage 3c and the duct 4 inserted into the passage 3c, and a part of the high-pressure fluid discharged from the fluid outlet ports 4a is also supplied to the specific chambers 2P via this clearance, the specific chambers 2P will still be inflated. However, the inflation of the specific chambers 2P will be delayed as compared to the inflation of the other chambers 2Q, 2C.

The air bag apparatus for a vehicle of the present invention is explained herein with reference to the first and second preferred embodiments. However, the skilled addressee will appreciate that the present invention is not limited to these embodiments and can embrace other embodiments and modifications, which are to be considered as within the scope of the present invention.

The invention claimed is:

1. An air bag apparatus for a vehicle comprising:
   an air bag body including a first inflatable chamber and a second inflatable chamber, each of the first and second inflatable chambers being arranged to be positioned along a roof side rail of the vehicle in a front to rear direction of the vehicle so that the first inflatable chamber overlies a pillar member of the vehicle and the second inflatable chamber overlies a side window of the vehicle; and a fluid supply delay device attached to the airbag body, the fluid supply delay device including a duct having a first outlet port communicating with a first inlet port of the first inflatable chamber and a second outlet port communicating with a second inlet port of the second inflatable chamber, the first outlet port having an opening area smaller than that of the second outlet port so as to reduce a flow rate of a high-pressure fluid supplied to the first inflatable chamber as compared to that of the high-pressure fluid supplied to the second inflatable chamber so that the second inflatable chamber is fully inflated to overlie the side window of the vehicle before the first inflatable chamber is fully inflated to overlie the pillar of the vehicle.

2. The air bag apparatus according to claim 1, wherein the air bag body is folded in an upward direction in a normal state, each of the first inflatable chamber and the second inflatable chamber being inflated with the high-pressure fluid supplied to the airbag body in an emergency state so that each of the first inflatable chamber and the inflatable second chamber deploys in a downward direction along a side wall of the vehicle.

3. An air bag apparatus for a vehicle comprising:
an air bag body including
a first inflatable chamber having a first inlet port and a first closed end opposite the first inlet port;
and a second inflatable chamber having a second inlet port and a second closed end opposite the second inlet port, and
a passage communicating with the first inlet port of the first inflatable chamber and the second inlet port of the second inflatable chamber,
each of the first and second inflatable chambers being arranged to be positioned along a roof side rail of the vehicle in a front to rear direction of the vehicle so that the first inflatable chamber overlies a pillar member of the vehicle and the second inflatable chamber overlies a side window of the vehicle; and
a fluid supply delay device attached to the airbag body, the fluid supply delay device includes a passage, and a duct inserted onto the passage, and the duct having an outlet port communicating directly with the second inlet port, the duct being free of an outlet port that directly communicates a high-pressure fluid supplied to the duct so that the high-pressure fluid is supplied indirectly to the first inflatable chamber only through the passage to reduce a flow rate of the high-pressure supplied to the first inflatable chamber as compared to that of the high-pressure fluid supplied to the second inflatable chamber so that the second inflatable chamber is fully inflated to overlie the side window of the vehicle before the first inflatable chamber is fully inflated to overlie the pillar of the vehicle.

4. The air bag apparatus according to claim 1, further comprises an inflator in fluid communication with the air bag body.

5. The air bag apparatus according to claim 4, wherein the duct includes a flexible duct member with the first and second outlet ports.

6. The air bag apparatus according to claim 4, wherein the air bag body is stowed in an upward direction when in an undeployed state, upon deployment, the inflator is configured to supply the high-pressure fluid to the air bag body thereby inflating each of the first and second inflatable chambers in a downward direction along the side portion of the vehicle body.

7. The air bag apparatus of according to claim 6, wherein the air bag body comprises an elongate passage, the elongate passage being in fluid communication with first and second inflatable chambers, and the elongate passage being adapted to receive the fluid supply delay device.

8. The air bag apparatus according to claim 1, wherein the air bag body is made from a fabric material.

9. The air bag apparatus according to claim 8, wherein the air bag body is made from canvas.

10. The air bag apparatus according to claim 1, wherein the high-pressure fluid is a gas.

11. A motor vehicle comprising an air bag apparatus according to claim 1.

12. An air bag apparatus comprising:
a vehicle body including at least an interior roof side rail, a pillar and a side window;
an air bag body located along the interior roof side rail, the air bag body including a first inflatable chamber and a second inflatable chamber, each of the first and second inflatable chambers being arranged to be positioned along a roof side rail of the vehicle in a front to rear direction of the vehicle so that the first inflatable chamber overlies the pillar member and the second inflatable chamber overlies the side window;
an inflator being in fluid communication with the air bag body; and
a fluid supply delay device located between the inflator and the air bag body, the fluid supply delay device including a duct having a first outlet port communicating with a first inlet port of the first inflatable chamber and a second outlet port communicating with a second inlet port to the second inflatable chamber, the first outlet port having an opening area smaller than that of the second outlet port so as to reduce a flow rate of a high-pressure fluid supplied to the first inflatable chamber as compared to that of the high-pressure fluid supplied to the second inflatable chamber so that the second inflatable chamber is fully inflated to overlie the side window before the first inflatable chamber is fully inflated to overlie the pillar.

13. The air bag apparatus according to claim 12, wherein the air bag body comprises an elongate passage in fluid communication with the first and second inflatable chambers, and the elongate passage is adapted to receive the fluid supply delay device.

14. The air bag apparatus according to claim 13, wherein the fluid delay device comprises a flexible duct member, the duct member comprising a plurality of fluid outlet ports, which fluid outlet ports communicate with the fluid inlet port on of each of the plurality of inflatable chambers.

15. The air bag apparatus according to claim 12, wherein the air bag body is made from a fabric material.

16. The air bag apparatus according to claim 12, wherein the air bag body is made from canvas.

17. The air bag apparatus according to claim 12, wherein the high-pressure fluid is a gas.

* * * * *